_United States Patent_ [19]

Swift

[11] 4,353,853

[45] Oct. 12, 1982

[54] METHOD FOR MAKING RETICULATED FOAM STRUCTURES

[75] Inventor: Joseph A. Swift, Ontario, N.Y.

[73] Assignee: Xerox Corporation, Stamford, Conn.

[21] Appl. No.: 171,561

[22] Filed: Jul. 23, 1980

[51] Int. Cl.³ .............................................. B29D 27/04
[52] U.S. Cl. ..................................... 264/41; 264/45.3; 264/236; 264/331.14; 264/DIG. 13; 264/DIG. 18; 521/52
[58] Field of Search ............ 264/41, 45.3, 49, 331.14, 264/236, DIG. 18, DIG. 13; 428/163; 521/52

[56] References Cited

U.S. PATENT DOCUMENTS

| | | | |
|---|---|---|---|
| 3,505,435 | 4/1970 | Schmidt | 264/41 |
| 3,620,895 | 11/1971 | Bailey et al. | 428/163 |
| 3,622,527 | 11/1971 | Dieterich et al. | 264/41 X |
| 3,625,871 | 12/1971 | Traubel et al. | 264/41 X |
| 3,642,668 | 2/1972 | Bailey et al. | 264/331.14 X |
| 3,666,542 | 5/1972 | Kigane et al. | 264/41 X |
| 3,753,932 | 8/1973 | Jenkins | 264/49 X |
| 3,769,381 | 10/1973 | Konig et al. | 264/41 |
| 3,856,914 | 12/1974 | Maeda et al. | 264/41 |
| 3,868,337 | 2/1975 | Gros . | |
| 4,203,848 | 5/1980 | Grandine | 264/41 X |

_Primary Examiner_—Philip E. Anderson

[57] ABSTRACT

A method for making reticulated foam structure of a crosslinkable thermosetting polymer which includes the steps of dissolving the polymer in a relatively volatile solvent, forming the resultant solution into an emulsion with a relatively less volatile emulsifying vehicle, forming the emulsion into the desired structure, removing the solvent from the structure, removing the vehicle and curing the structure to form a reticulated foam structure.

9 Claims, No Drawings

METHOD FOR MAKING RETICULATED FOAM STRUCTURES

BACKGROUND OF THE INVENTION AND PRIOR ART STATEMENT

This invention relates to a method for preparing reticulated foam structures of a crosslinkable thermosetting polymer.

It is well known that foam or cellular polymeric structures have many uses, such as the material of construction for various containers, and as packaging and insulating materials. Foamed polymers may also be used as the materials for wicks or applicators in applying a metered amount of a lubricant or other fluids.

A variety of methods for preparing foamed polymeric structures are known in the art. A number of such methods are disclosed in U.S. Pat. No. 3,753,932 to Jenkins. The invention of that patent relates to a process for making open-celled polymeric structures which involves the steps of dissolving the polymer in a chlorofluorocarbon solvent to form a polymer solution, cooling the solution to form a solidified solution, and removing the solvent from the solidified solution at a temperature below the solidification temperature of the solvent. If water is added to the polymer solution of Jenkins to produce a liquid emulsion, then the emulsion is cooled to a temperature above the solidification temperature of water (0° C.) but below the solidification temperature of the solvent. The water is then removed from the solidified emulsion before the removal of the solvent. The method of Jenkins produces open-celled polymeric structures, but it requires the use of a chlorofluorocarbon solvent and the preparation of a polymeric solution at elevated temperatures, for example by refluxing. Moreover, Jenkins removes the solvent by sublimation from the solidified solution to leave the polymeric structure in cellular form. Accordingly, there is a need for an improved and economical method for making reticulated foam structure of a crosslinkable thermosetting polymer.

In Gros U.S. Pat. No. 3,868,337, there is disclosed a process for preparing a closed-cell foam from a vinylidene fluoride/hexafluoropropylene copolymer by vulcanizing the copolymer in the presence of a blowing agent and a vulcanization agent. The vulcanization in the process of Gros is carried out at elevated temperature and pressure. As the vulcanizing agent, Gros discloses the use of the oxides and hydroxides of lead and calcium, or the oxides and hydroxides of zinc and magnesium in combination with at least one lead or zinc salt.

In Schmidt U.S. Pat. No. 3,505,435, there is disclosed a method for producing a partially foamed thermoplastic container, which includes the steps of injection molding of a foamable preform and heating selected portions of the preform to form a partially foamed article. A cooling step to prevent further foaming follows the heating step. The patent states that at the point of end use, the foaming of the article may be completed by heating.

Finally, in Cellular Viton, Haaf et al, DuPont "Viton" Bulletin No. 27, 1968, TS1925 D95v, methods for preparing open-cell and closed-cell Viton sponges are disclosed. The method for making open-cell Viton sponge includes the steps of mixing the Viton formulation in a cold laboratory mill and forming the mixture into a sheet, curing the sheet under light pressure and elevated temperatures, and post-curing at a higher elevated temperature.

SUMMARY OF THE INVENTION

It is an object of the present invention to provide an improved method for making a reticulated foam structure of a crosslinkable thermosetting polymer.

It is another object of the present invention to provide an improved method for making a reticulated foam structure, which is relatively simple to carry out and does not require relatively expensive processing steps or materials.

These and other objects of the invention will be apparent from the following detailed disclosure.

In accordance with the present invention, a method for making a reticulated foam structure of a crosslinkable thermosetting polymer is provided in which the polymer is first dissolved in a solvent, forming the resultant solution into an emulsion with an emulsifying vehicle which is less volatile than the solvent, forming the emulsion into the desired structure, removing the solvent, removing the vehicle, and curing the resultant structure to form a reticulated foam structure.

DETAILED DESCRIPTION OF THE INVENTION

As indicated above, this invention provides a method for making a reticulated, open cell, foam structure of a crosslinkable thermosetting polymer. The polymer is dissolved in a relatively volatile solvent and the resultant solution is then formed into an emulsion by the use of a relatively less volatile emulsifying vehicle. The emulsion is then formed into the desired structural shape, and the solvent is then removed while the emulsifying vehicle is still present to insure the integrity of the foam. Once the solvent has been removed, the emulsifying vehicle may be also removed. Preferably, the removal of the emulsifying vehicle is carried out concurrently with the initial and partial curing of the crosslinkable thermosetting polymer. The complete curing of the foamed structure can then take place at the desired temperature level.

The polymers suitable for use in the method of the present invention are crosslinkable thermosetting polymers. Examples of such crosslinkable thermosetting polymers include: the elastomeric silicone resins; polyurethanes; epoxy resins; and fluoroelastomers. Particularly suitable for the purposes of the present invention are a family of fluoroelastomers available from the DuPont Company under its tradename Viton. Vitons are copolymers or terpolymers of vinylidene fluoride and at least one fluoroalkylene. As a group, Vitons are stable at higher temperatures than most other polymers. Thus, Viton foams are useful in high temperature applications such as in electrostatographic fusing systems.

Suitable solvents for use in the process of the present invention are those which are capable of dissolving the crosslinkable thermosetting polymers, and possessing a relatively high volatility at normal temperatures. The solvent should have a higher volatility than the emulsifying vehicle, so that the solvent can be removed from the foam structure before the emulsifying vehicle is removed. Since the most common and convenient emulsifying vehicle is water, the solvent should be one that has a volatility greater than that of water. It has been found that methyl ethyl ketone and acetone are the most preferred solvents, when they are capable of dissolving the polymer being used. Mixtures of solvents may be used.

As indicated above, the emulsified vehicle should be one that has less volatility than the solvent at normal operating temperatures. The most commonly available emulsifying vehicle is water. The surface active agents which may be used with water for forming an emulsion are well known to the art. We prefer to use a material available from Rohm & Haas under its tradename Triton X-100, which may be octyl phenoxypolyethoxyethanol. When the foam structure of the present invention is to be removed from a mold or cast in which it is formed, the removal may be facilitated by the use of a mold releasing agent such as a fluorosilicone fluid. Alternatively, when the foam is intended to be a permanent part of the surface on which the emulsion is applied, a primer may be used to promote adhesion.

When Viton is the crosslinkable thermosetting polymer, the vulcanizing or curing agents most commonly used are a mixture of magnesium oxide and a material available from the DuPont Company under its tradename Diac. Diac No. 3 appears to be N,N'-dicinnamylidene-1,6-hexanediamine. Other vulcanizing and curing agents are known to the art. Fillers and coloring agents and other additives may be incorporated in the polymer solution prior to the formation of an emulsion. The most common additive is carbon black. Other additives and fillers are also well known in the art.

It is a particular advantage in the process of the present invention that the polymer emulsion may be formed at ordinary room temperatures. Moreover, the solvent may also be removed from the emulsion at the room temperatures. It is only when the emulsifying vehicle is removed from the foamed structure, and when the curing of the polymer takes place, that elevated temperatures need be applied. It will be noted that the polymer solution and the polymer emulsion may remain in the liquid state and that the practice of the process of this invention does not require that the solution or the emulsion be solidified. Another important advantage of the present invention over the methods of the prior art resides in the fact that commonly available and inexpensive solvents are used in forming the polymer solution.

The invention will be further illustrated with the following examples:

EXAMPLE I 100 parts by weight of Viton B, available from the DuPont Company, and believed to be a terpolymer of vinylidene fluoride, hexafluoropropylene and tetrafluoroethylene, 15 parts of magnesium oxide, 20 parts carbon black, and 2.5 parts Diac No. 3 were mixed together to form a polymer formulation. 20 grams of the polymer formulation was then vigorously mixed with 80 grams of methyl ethyl ketone (MEK) in a Waring Laboratory Blender to form a polymer solution. 3 drops of a surfactant, Triton X-100, and 50 grams of distilled water were then added to the solution and thoroughly mixed in the Waring blender to form an emulsion. The emulsion was cast into a mold which is in the shape of an open dish made of aluminum foil. The emulsion in the mold was ventilated at room temperature for about one hour, during which time the bulk of MEK has evaporated. The mold was then placed in an oven and the water removed from the emulsion by a programmed temperature rise at the rate of about 10° C. per minute until the temperature 150° C. Then the temperature of the oven was held at 150° C. for about one hour for the Viton to cure. The resultant material is a fully open called Viton foam which can be made to be less than about 100 mils in thickness.

EXAMPLE II 50 grams of Viton B, 7.5 grams of MgO, 10 grams of carbon black, and 1.25 grams of Diac No. 3 were mixed together to form a polymer formulation. 200 cc of MEK was added to the formulation and the mixture vigorously mixed with a Waring blender for about 5 minutes. After the polymer was completely dissolved, 50 cc of water and 3 drops of Triton X-100 were added. The mixture was again vigorously mixed in the blender to form an emulsion.

A part of the resultant emulsion was poured into a mold made of aluminum foil. It was dried for about 15 minutes in an oven maintained at 150° C. Thereafter, the curing of the polymer foam was continued for about 45 minutes at 150° C. A foamed film of about 20 mils in thickness was produced.

EXAMPLE III

The emulsion of Example II was placed into two additional molds and both air dried for 15 minutes at ambient temperature. The molds were then placed in a 150° C. oven for about 1 hour. Films of foamed polymer 10 and 70 mils thick were produced.

It may be appreciated that the process of the present invention, while capable of making a polymeric reticulated foam structure of almost any shape by the use of proper molds, is particularly suited for the making of the polymer foam in layered or film form. The polymer emulsion can be cast or molded into films of practically any desired thickness. Moreover, the polymer emulsion can be coated onto an existing structure by conventional means, such as dip coating.

While the invention has been disclosed with reference to certain preferred embodiments including devices, structures and methods described herein, it will be apparent that certain modifications and changes can be made without departing from the spirit and scope of the invention, and therefore, it is intended that the foregoing disclosure be limited only by the claims appended hereto.

What is claimed is:

1. A process for making reticulated foam structure of a cross-linkable thermosetting fluoroelastomer which comprises: the sequential steps of dissolving said fluoroelastomer in a solvent to form a solution, said solvent being evaporatable at or about ambient temperature; adding an emulsifying vehicle and a surface active agent to said solution, said emulsifying vehicle having a normal volatility lower than that of said solvent, and forming the mixture into an emulsion; forming said emulsion into the desired structure; substantially removing said solvent from said emulsion structure at or about ambient temperature while said emulsifying vehicle is present; removing said vehicle from said structure; and curing the polymer structure to form a reticulated foam structure.

2. A process according to claim 1 wherein said emulsifying vehicle is water.

3. A process according to claim 1 wherein said solvent is acetone or methyl ethyl ketone or a mixture of acetone and methyl ethyl ketone.

4. A process according to claim 2 wherein said fluoroelastomer is a copolymer or terpolymer of vinylidene fluoride and a fluoroalkylene.

5. A process according to claim 4 wherein said emulsifying vehicle is water; and wherein said solvent is methyl ethyl ketone and it is removed from said emulsion structure at about ambient temperature.

6. A process according to claim 5 wherein said solution further comprising a filler for said polymer.

7. A process according to claim 5 wherein said reticulated foam structure is in a layer form.

8. A process according to claim 1 wherein the removal of said emulsifying vehicle is carried out concurrently with the initial and partial curing of the polymer.

9. A process according to claim 8 wherein said polymer is cured at elevated temperature.

* * * * *